Aug. 30, 1932.  W. P. CREAGER  1,873,955
FLUID CONTROL SYSTEM
Filed July 13, 1929
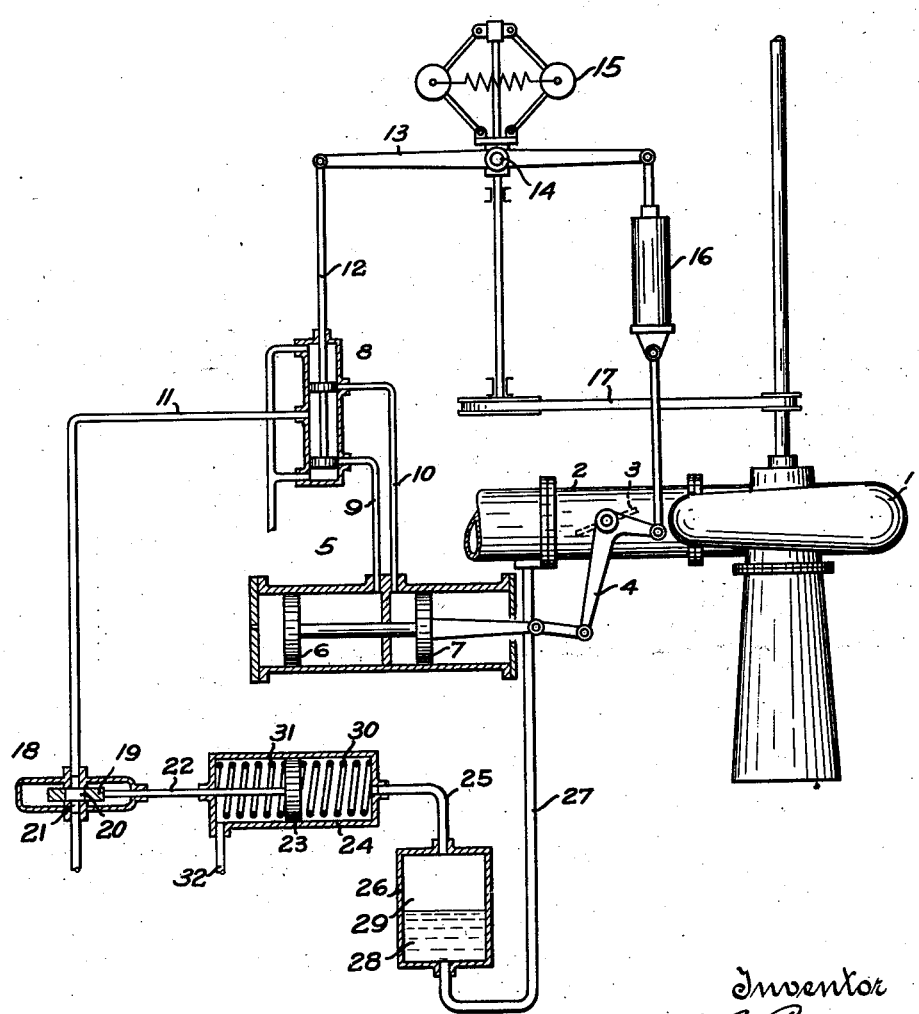

Patented Aug. 30, 1932

1,873,955

UNITED STATES PATENT OFFICE

WILLIAM P. CREAGER, OF WATERTOWN, NEW YORK, ASSIGNOR TO ALLIS-CHALMERS MANUFACTURING COMPANY, OF MILWAUKEE, WISCONSIN, A CORPORATION OF DELAWARE

FLUID CONTROL SYSTEM

Application filed July 13, 1929. Serial No. 377,970.

This invention relates to fluid control systems, and more particularly of the hydraulic type. In its more specific form it relates to the control of hydraulic turbines and the like, and it will be described as a matter of convenience in this connection.

In the control of hydraulic turbines it is necessary to control the flow of water to the turbine. Control of the water flowing in the conduit supplying the turbine may give rise to abnormal pressure conditions in the conduit. This is particularly true if it is attempted to rapidly change the amount of water flowing. It is one of the objects of the invention to obviate this disadvantage.

Moreover in governor controlled turbines, as the load varies on the turbine it is desirable in order to keep the speed constant to vary the supply of water to the turbine in accordance with rapid load changes. This necessitates a fast acting governor. There is accordingly danger that excessive positive or negative pressures may be developed. It is therefore a further object of the invention to provide a system which will permit the utilization of a normally fast acting governor with resultant better speed regulation, while avoiding the dangers of abnormal pressure conditions.

A more specific object is the provision of a governor which is normally comparatively fast acting and which is so controlled in response to pressure conditions in the conduit which it controls that its speed of operation will vary in accordance with the pressure conditions in said conduit.

Other objects will appear hereinafter as the description of the invention proceeds.

The novel features of the invention will appear from this specification and the accompanying drawing forming a part thereof and illustrating one embodiment of the invention and all these novel features are intended to be pointed out in the claims.

The single figure of the drawing illustrates one embodiment of the invention as it may be applied in connection with the control of a hydraulic turbine.

Referring to the drawing, a turbine 1 may be supplied with water in any suitable manner as through a conduit 2. The amount of water flowing in this conduit may be controlled in any of the usual ways as by means of turbine guide vanes, the needle of the nozzle in the case of an impulse wheel or any other means for controlling the flow of fluid supplied to the prime mover 1. For the sake of simplicity the means for controlling the supply of fluid has been here illustrated as a valve 3, and for the sake of brevity any means for controlling the supply of fluid will be hereinafter termed a gate. The gate 3 may be operated by means of a crank 4 suitably connected to a servo-motor 5 which in the instance shown is provided with two pistons 6, 7 disposed in suitable cylinders. The form of the servo-motor is immaterial and may of course be one in which but one piston is utilized in one cylinder or any other form. The servo-motor 5 may be controlled by means of a regulating valve 8 which is of any desired form such that when the regulating valve is in the neutral position as shown both exit ports to which pipes 9 and 10 are respectively connected will be closed. The regulating valve 8 may be supplied with fluid under pressure through a pipe 11, the arrangement being such that if a valve stem 12 of the regulating valve is lifted, for example, fluid under pressure will be admitted through pipe 11 through pipe 10 to the cylinder in which piston 7 is disposed thereby causing movement of the valve 3 toward the closed position. In a similar manner when the valve stem 12 is moved downwardly fluid under pressure is admitted through pipe 9 to cause piston 6 to move the valve 3 toward the open position. The regulating valve 8 is provided with the usual drain pipes.

The regulating valve stem 12 is here shown as suitably pivotally connected to a floating lever 13 having a floating pivot 14 which may be moved upwardly or downwardly by means of fly balls 15. The other end of the floating lever 13 has suitably connected thereto one element of a dash pot 16 the other element of which is connected to a shaft of the valve 3, as by a crank. The dash pot 16 serves as the usual compensating connection so that the gate will not over travel the desired position in response to a definite speed change, or in general to a definite adjustment of the regulating valve 8. The fly balls 15 may be driven in any suitable manner as by means of a belt 17 so as to be responsive to the speed of the prime mover 1.

Interposed in the pipe 11 between the regulating valve 8 and the source of fluid under pressure (not shown) is a valve 18 here shown as of the double acting type. The valve 18 comprises a valve member 19 having a hole 20 therein, this hole being here shown as somewhat larger than the hole 21 in the valve seat. The valve member 19 is reciprocable by means of a stem 22 connected to a piston 23 disposed in a cylinder 24. The cylinder 24 has connected thereto a pipe 25 which is in turn connected to an oil storage reservoir 26, in turn connected by means of a pipe 27 to the conduit 2. The pipe 27 is connected on the up-stream side of the means for controlling the flow of fluid in the conduit, as the gate 3. The pressure conditions in the conduit 2 are transmitted through the pipe 27, the water or other fluid in the conduit 2 extending into the reservoir 26 as indicated at 28. On top of the water 28 is a body of oil 29 which extends through the pipe 25 into the cylinder 24 and is adapted to transmit the pressure conditions in the conduit 2 to the piston 23. The oil reservoir 26 may if desired be omitted and the connection between the cylinder 24 and the conduit made direct.

The piston 23 is biased to a predetermined position by means of springs 30 and 31, and these springs are so selected or adjusted that for a predetermined normal pressure in conduit 2 the valve member 19 will be in its central position as shown on the drawing. The cylinder 24 is shown as provided with a drain 32 to carry away any oil or other fluid which may leak past the piston 23.

The operation of the described embodiment of the invention is as follows. Assuming that the position of the parts is as shown in the drawing, the turbine 1 being in operation, and that the load on the turbine is decreased thereby increasing the speed thereof, the fly balls 15 will act to lift the valve stem 12 a predetermined amount thereby causing movement of the gate 3 toward the closed position. The resultant decrease in the amount of flow through the conduit 2 will increase the pressure a predetermined amount thereby causing movement of the piston 23 toward the left, as viewed in the figure. If the pressure increase is not more than a predetermined amount such movement will not have any effect on the flow of pressure fluid through the pipe 11 due to the fact that the hole 20 is larger than the valve seat 21. If however the pressure increase is greater than a predetermined amount the movement of the valve member 19 toward the left will restrict to a predetermined extent the flow of pressure fluid through the pipe 11 and therefore will at once decrease the speed of piston 7 and gate 3. Thus excessive pressure rise in conduit 2 is prevented. Clearly the predetermined limits can be suitably selected so that no pressure rises dangerous to the conduit 2 can occur. When the pressure conditions are again back to normal the valve 18 will return to the position shown on the drawing.

If for example, a pressure should obtain in conduit 2 a predetermined amount below normal, the piston 23 will be moved toward the right as viewed in the figure by the spring 31 thereby, if the movement is sufficient, causing restriction, just as in the case of excessive pressure, of the pressure fluid flowing in pipe 11 thus reducing the rate of opening of the gate 3.

It will be understood from the specification that the system in certain of its aspects is useful without the use of a speed governor.

It should be understood that it is not desired to limit the invention to the exact details of description shown and described for obvious modifications may occur to persons skilled in the art.

It is claimed and desired to secure by Letters Patent:

1. In combination, a conduit for liquid, a gate in said conduit, means for operating said gate, means for controlling said operating means to operate said gate at a predetermined maximum speed, and means responsive to pressure in said conduit for causing said controlling means to control the speed of said gate inversely in accordance with increase in pressure above normal.

2. In combination, a conduit for liquid, a gate in said conduit, means for operating said gate, means for controlling said operating means to operate said gate at a predetermined maximum speed, and means responsive to pressure in said conduit for causing said controlling means to control the speed of said gate inversely in accordance with decrease in pressure from a value above normal.

3. In combination, a conduit for liquid, a gate in said conduit, means for operating said gate, means for controlling said operating means to operate said gate at a predetermined maximum speed, and means responsive to pressure in said conduit for causing said controlling means to control the speed of said gate directly in accordance with decrease in pressure a predetermined amount below normal.

4. In combination, a conduit for liquid, a gate in said conduit, means for operating said gate, means for controlling said operating means to operate said gate at a predetermined maximum speed, and means responsive to pressure in said conduit for causing said controlling means to control the speed of said gate inversely in accordance with increase and directly in accordance with decrease in pressure above and below a predetermined range respectively.

5. In a prime mover control system, a conduit for supplying said prime mover with operating fluid, a gate in said conduit, a servo-motor for operating said gate, a regulating valve for said servo-motor, and means responsive to pressure in said conduit for progressively altering the effect of said regulating valve on said servo-motor in accordance with the pressure in said conduit.

6. In a prime mover control system, a conduit for supplying said prime mover with operating fluid, a gate in said conduit, a servo-motor for operating said gate, a regulating valve for said servo-motor, means for supplying said regulating valve with fluid under pressure, and means responsive to pressure in said conduit for controlling the supply of pressure fluid to said regulating valve.

7. In a prime mover control system, a conduit for supplying said prime mover with operating fluid, a gate in said conduit, a servo-motor for operating said gate, a regulating valve for said servo-motor, means responsive to the speed of said prime mover for controlling said regulating valve, and means responsive to pressure in said conduit for progressively altering the effect of said regulating valve on said servo-motor in accordance with the pressure in said conduit.

8. In a prime mover control system, a conduit for supplying said prime mover with operating fluid, a gate in said conduit, a servo-motor for operating said gate, a regulating valve for said servo-motor, means responsive to the speed of said prime mover for controlling said regulating valve, means for supplying said regulating valve with fluid under pressure, and means responsive to pressure in said conduit for controlling the supply of pressure fluid to said regulating valve.

9. In a prime mover control system, a conduit for supplying said prime mover with operating fluid, a gate in said conduit, a servo-motor for operating said gate, a regulating valve for said servo-motor, a pipe for supplying said regulating valve with pressure fluid, a valve in said pipe, a piston for operating said valve, a cylinder in which said piston is disposed, means for connecting said cylinder with said conduit, and means for biasing said valve to a predetermined position when a predetermined pressure obtains in said conduit.

10. In a prime mover control system, a conduit for supplying said prime mover with operating fluid, a gate in said conduit, a servo-motor for operating said gate, a regulating valve for said servo-motor, a pipe for supplying said regulating valve with pressure fluid, a double acting valve in said pipe, said valve being closed in opposite limiting positions and open in a central position, a piston for operating said valve, a cylinder in which said piston is disposed, means for connecting said cylinder with said conduit, and means for biasing said valve to the central position when a predetermined pressure obtains in said conduit.

11. In a prime mover control system, a conduit for supplying said prime mover with operating fluid, a gate in said conduit, a servo-motor for operating said gate, a regulating valve for said servo-motor, means responsive to pressure in said conduit for progressively altering the effect of said regulating valve on said servo-motor in accordance with the pressure in said conduit, and means whereby said pressure may vary within a predetermined range without causing any of said altering effect.

12. In a prime mover control system, a conduit for supplying said prime mover with operating fluid, a gate in said conduit, a servo-motor for operating said gate, a regulating valve for said servo-motor, a pipe for supplying said regulating valve with pressure fluid, a valve in said pipe, a piston for operating said valve, a cylinder in which said piston is disposed, means for connecting said cylinder with said conduit, said valve being open when a predetermined pressure obtains in said conduit, and means whereby said pressure may vary within a predetermined range without causing closure of said valve.

13. In a prime mover control system, a conduit for supplying said prime mover with operating fluid, a gate in said conduit, a servo-motor for operating said gate, a regulating valve for said servo-motor, a pipe for supplying said regulating valve with pressure fluid, a double acting valve in said pipe, said valve being closed in opposite limiting positions and open in a central position, a piston for operating said valve, a cylinder in which said piston is disposed, means for connecting said cylinder with said conduit, and means whereby said pressure may vary within a predetermined range while maintaining said valve in fully open condition.

14. In combination, a conduit for a liquid, a gate in said conduit, means for operating said gate, means for controlling said operating means to operate said gate at predetermined speeds dependent on the adjustment of said controlling means, and means responsive to pressure in said conduit on the upstream side of said gate for progressively reducing said predetermined speeds in accordance with increase in said pressure.

15. In a prime mover control system, a conduit for supplying said prime mover with operating liquid, a gate in said conduit, means for operating said gate, means for controlling said operating means to operate said gate at predetermined speeds dependent upon the adjustment of said controlling means, means responsive to the speed of said prime mover for controlling said gate-operating controlling-means, and means responsive to pressure in said conduit on the upstream side of said gate for progressively reducing said predetermined gate-speeds in accordance with increase in said pressure.

16. In combination, a conduit for a liquid, a gate in said conduit, means for operating said gate, means including a second conduit for controlling said operating means to operate said gate at predetermined speeds independent on the adjustment of said controlling means, and means responsive to pressure in said conduit on the upstream side of said gate and including a variable orifice device in said second conduit for progressively reducing said predetermined speeds in accordance with increase in said pressure, and reducing the speed of said gate to zero with a predetermined increase in said pressure.

17. In a prime mover control system, a conduit for supplying said prime mover with operating liquid, a gate in said conduit, means for operating said gate, means for controlling said operating means to operate said gate at predetermined speeds dependent upon the adjustment of said controlling means, means responsive to the speed of said prime mover for controlling said gate-operating controlling-means, and means responsive to pressure in said conduit on the upstream side of said gate for progressively reducing said predetermined gate-speeds in accordance with increase in said pressure, and reducing the speed of said gate to zero with a predetermined increase in said pressure.

18. In combination, a conduit for a liquid, a gate in said conduit, means for operating said gate, means for controlling said operating means to operate said gate at predetermined speeds dependent on the adjustment of said controlling means, and means responsive to pressure in said conduit on the upstream side of said gate and including a variable constriction device for progressively reducing said predetermined speeds in accordance with increase or decrease in said pressure.

19. In a prime mover control system, a conduit for supplying said prime mover with operating liquid, a gate in said conduit, means for operating said gate, means for controlling said operating means to operate said gate at predetermined speeds dependent upon the adjustment of said controlling means, means responsive to the speed of said prime mover for controlling said gate-operating controlling-means, and means responsive to pressure in said conduit on the up-stream side of said gate for progressively reducing said predetermined gate-speeds in accordance with increase or decrease in said pressure.

20. In combination, a conduit for a liquid, a gate in said conduit, means for operating said gate, means including a source of fluid under pressure for controlling said operating means to operate said gate at predetermined speeds dependent on the pressure of said source of fluid, and means responsive to pressure in said conduit on the upstream side of said gate for progressively reducing the pressure of said source in accordance with increase or decrease in said pressure in said conduit, and reducing the speed of said gate to zero with a predetermined increase or decrease in said pressure.

21. In a prime mover control system, a conduit for supplying said prime mover with operating liquid, a gate in said conduit, means for operating said gate, means for controlling said operating means to operate said gate at predetermined speeds dependent upon the adjustment of said controlling means, means responsive to the speed of said prime mover for controlling said gate-operating controlling-means, and means responsive to pressure in said conduit on the upstream side of said gate for progressively reducing said predetermined gate-speeds in accordance with increase or decrease in said pressure, and reducing the speed of said gate to zero with a predetermined increase or decrease in said pressure.

22. In a system for controlling the flow of fluid in a conduit, the combination of, a conduit for conveying fluid under pressure, a valve in said conduit for controlling the flow of said fluid, a servo-motor for actuating said valve, said servo-motor having a regulating valve for controlling said servo-motor, a source of fluid under pressure for normally operating said servo-motor at a predetermined speed in response to actuation of said regulating valve, and means interposed between said source and said regulating valve for varying said speed of operation of said servo-motor in response to abnormal pressure in said conduit.

23. In a system for controlling the flow of fluid through a conduit, the combination of, a conduit for conveying fluid under pressure, a gate in said conduit for controlling the flow of said fluid, a servo-motor for actuating said gate, a source of fluid under pressure for actuating said servo-motor, means including a servo-motor valve for controlling the actuation of said servo-motor, and means independent of said servo-motor valve for controlling the rate of actuation of said servo-motor in response to abnormal pressure in said conduit.

24. In a system for controlling the flow of fluid to a translating device, the combination of, a conduit for conveying fluid under pressure to said translating device, a valve in said conduit for controlling the flow of said fluid, a servo-motor for actuating said valve, said servo-motor having a regulating valve therefor, means for supplying said servo-motor with fluid under pressure in response to the position of said regulating valve, and means for restricting the pressure of said pressure supplying means in response to the pressure in said conduit.

In testimony whereof, the signature of the inventor is affixed hereto.

WILLIAM P. CREAGER.